(12) United States Patent
Lee

(10) Patent No.: US 10,696,409 B2
(45) Date of Patent: Jun. 30, 2020

(54) CONVERTIBLE SEATING UNIT AND SEATING ARRANGEMENT

(71) Applicant: BUTTERFLY FLEXIBLE SEATING SOLUTIONS LIMITED, Fotan, New Territories (HK)

(72) Inventor: James Shing Hin Lee, Kowloon (HK)

(73) Assignee: BUTTERFLY FLEXIBLE SEATING SOLUTIONS LIMITED, Hong Kong (HK)

( * ) Notice: Subject to any disclaimer, the term of this patent is extended or adjusted under 35 U.S.C. 154(b) by 0 days.

(21) Appl. No.: 15/769,994

(22) PCT Filed: Oct. 12, 2016

(86) PCT No.: PCT/CN2016/101856
§ 371 (c)(1),
(2) Date: Apr. 20, 2018

(87) PCT Pub. No.: WO2017/067409
PCT Pub. Date: Apr. 27, 2017

(65) Prior Publication Data
US 2018/0281969 A1    Oct. 4, 2018

Related U.S. Application Data

(60) Provisional application No. 62/243,713, filed on Oct. 20, 2015.

(51) Int. Cl.
*B64D 11/06* (2006.01)
*B60N 2/02* (2006.01)

(52) U.S. Cl.
CPC ........ *B64D 11/0641* (2014.12); *B60N 2/0292* (2013.01); *B64D 11/0601* (2014.12); *B64D 11/0606* (2014.12)

(58) Field of Classification Search
CPC .............. B60N 2/0292; B64D 11/0641; B64D 11/0601; B64D 11/0606
(Continued)

(56) References Cited

U.S. PATENT DOCUMENTS

| | | | | |
|---|---|---|---|---|
| 5,857,745 A * | 1/1999 | Matsumiya | ............... | B60N 2/34 297/354.13 |
| 6,692,069 B2 * | 2/2004 | Beroth | ................. | A47C 1/0352 244/118.6 |

(Continued)

FOREIGN PATENT DOCUMENTS

| | | |
|---|---|---|
| EP | 2 727 837 A2 | 7/2014 |
| FR | 2924683 | 6/2009 |

(Continued)

OTHER PUBLICATIONS

International Search Report Application No. PCT/CN2016/101856 Completed: Dec. 26, 2016; dated Jan. 20, 2017 3 pages.

(Continued)

*Primary Examiner* — Rodney B White
(74) *Attorney, Agent, or Firm* — Ware, Fressola, Maguire & Barber LLP

(57) ABSTRACT

A seating unit (202, 204) includes a first seat (206, 210) and an adjacent second seat (208, 212), the seating unit being convertible between a first configuration in which each of the first seat (206, 210) and second seat (208, 212) can receive an occupant sitting thereon and a second configuration in which the first seat (206, 210) and second seat (208, 212) can collectively support an occupant lying thereon, and access to a space (215) in a back portion of the first seat (206, 210) being denied when the seating unit (202, 204) is in the first configuration and access to the space (215) being allowed when the seating unit (202, 204) is in the second configuration, the seating unit (202, 204) gives the passenger in the first seat (206, 210) a perception of increased spa- (Continued)

ciousness, and provides sufficient differentiation between the economy-class configuration and the business-class configuration.

1 Claim, 4 Drawing Sheets

(58) Field of Classification Search
USPC .... 297/188.04, 188.07, 188.09, 188.13, 118, 297/232, 233, 248
See application file for complete search history.

(56) References Cited

U.S. PATENT DOCUMENTS

| | | | |
|---|---|---|---|
| 7,252,332 B2 | 8/2007 | Thompson | |
| 7,469,861 B2* | 12/2008 | Ferry | B60N 2/206 244/118.6 |
| 7,578,470 B2 | 8/2009 | Plant | B64D 11/06 244/118.6 |
| 7,721,990 B2* | 5/2010 | Jaeger | B64D 11/00 244/118.6 |
| 7,837,259 B2* | 11/2010 | Staab | B64D 11/06 244/118.5 |
| 7,918,504 B2* | 4/2011 | Thompson | B64D 11/02 297/248 |
| 8,011,723 B2* | 9/2011 | Park | B60N 2/345 244/118.6 |
| 8,177,165 B2 | 5/2012 | Bettell | |
| 8,245,970 B2* | 8/2012 | Harcup | B64D 11/06 244/118.5 |
| 8,313,060 B2 | 11/2012 | Darbyshire | |
| 8,414,076 B2* | 4/2013 | Plant | B64D 11/06 244/118.6 |
| 8,690,254 B2* | 4/2014 | Cailleteau | B64D 11/06 297/411.36 |
| 8,807,481 B2* | 8/2014 | Plant | B64D 11/06 244/118.6 |
| 8,882,035 B2* | 11/2014 | France | B64D 11/0023 244/118.6 |
| 8,936,214 B2* | 1/2015 | Foucher | B64D 11/06 244/118.6 |
| 8,998,139 B2* | 4/2015 | Dryburgh | B64D 11/06 244/118.6 |
| 9,126,689 B2 | 9/2015 | Porter | |
| 9,162,768 B2* | 10/2015 | Henshaw | B64D 11/06 |
| 9,409,648 B2* | 8/2016 | Eakins | B64D 11/06 |
| 9,533,765 B2* | 1/2017 | Vergnaud | B64D 11/06 |
| 2007/0040434 A1 | 2/2007 | Plant | |
| 2008/0185887 A1* | 8/2008 | Merensky | B61D 31/00 297/217.3 |
| 2009/0066121 A1* | 3/2009 | Jacob | A47C 15/00 297/118 |
| 2009/0243352 A1* | 10/2009 | Cailleteau | B64D 11/06 297/188.01 |
| 2012/0112500 A1* | 5/2012 | Rundle | B64D 11/00 297/147 |
| 2012/0146372 A1* | 6/2012 | Ferry | B64D 11/06 297/232 |
| 2012/0223557 A1* | 9/2012 | Henshaw | B64D 11/06 297/232 |
| 2012/0274109 A1* | 11/2012 | Harcup | B64D 11/06 297/232 |
| 2012/0292957 A1* | 11/2012 | Vergnaud | B64D 11/06 297/188.08 |
| 2013/0043345 A1* | 2/2013 | Ferry | B60N 2/206 244/118.6 |
| 2013/0106156 A1* | 5/2013 | Orson | B64D 11/06 297/217.3 |
| 2014/0159440 A1* | 6/2014 | Porter | B60N 2/01 297/163 |
| 2014/0210235 A1* | 7/2014 | Ferry | B60N 2/206 297/118 |
| 2014/0283296 A1 | 9/2014 | Jerome et al. | |
| 2014/0300152 A1* | 10/2014 | Park | B64D 11/06 297/232 |
| 2015/0329208 A1* | 11/2015 | Eakins | B64D 11/06 297/232 |
| 2015/0360783 A1* | 12/2015 | Cailleteau | B60N 2/345 244/118.6 |
| 2016/0009398 A1* | 1/2016 | Klettke | B60N 2/90 297/183.6 |
| 2016/0016667 A1* | 1/2016 | Schmidt-Schaffer | B64D 11/0627 244/118.6 |
| 2017/0029118 A1 | 2/2017 | Ehrmann et al. | |

FOREIGN PATENT DOCUMENTS

| | | |
|---|---|---|
| FR | 2934564 | 2/2010 |
| GB | 2 438 162 A | 11/2007 |
| GB | 2500258 | 9/2013 |
| JP | S58 22341 U | 2/1983 |
| WO | 2006/054064 A1 | 5/2006 |
| WO | 2014115107 | 7/2014 |
| WO | 2015081496 | 6/2015 |
| WO | 2015/155687 A1 | 10/2015 |

OTHER PUBLICATIONS

Supplementary European Search Report, application No. EP 16 85 6841, dated May 6, 2019, 4 pages.

* cited by examiner

CONVERTIBLE SEATING UNIT AND SEATING ARRANGEMENT

CROSS-REFERENCE TO RELATED APPLICATIONS

This application is the U.S. national stage of international application number PCT/CN2016/101856 filed 12 Oct. 2016 and claims benefit of U.S. provisional application No. 62/243,713 filed 20 Oct. 2015.

BACKGROUND OF THE INVENTION

This invention relates to a convertible seating unit and a seating arrangement incorporating such a convertible seating unit suitable for, but not limited to, use on transportation vehicles, e.g. aircraft.

It is common to arrange for more than one class of cabins in an aircraft. In addition to the relatively densely packed economy class, there is usually a separate cabin area for premium class (or business class) with a lower seating density, giving a greater seating width and legroom to satisfy passengers who can afford a higher budget.

The configuration of such cabins, i.e. the proportion between economy class and premium class is often fixed and cannot be modified quickly and easily. On the other hand, it is of course the case that demand for seats in the economy class and that for seats in the premium class vary across different flights and different seasons. As one fixed configuration cannot fit all the flights or adapt to varying demands for premium seats and economy seats, an airline company cannot operate to maximize its profit.

Convertible seating units have been proposed. Such seating units may be converted into seat arrangements of different seating densities, usually by adjusting the width of the seats by varying the number of seats in each row. For example, U.S. Pat. No. 6,715,716 discloses a seat assembly in which part of a back portion of a seat of a front row is movable to form a leg support for a seat of an adjacent rear row.

However, although more legroom is available in the seat assembly of U.S. Pat. No. 6,715,716, such is only suitable for sleeping posture, which a passenger may not wish to adopt during most of the flight time. For hygiene reasons, passengers may not wish to occupy a seat which can be converted into a leg support. In any event, thorough cleaning of the seat of the front row is a must. Furthermore, such prior art convertible seating units do not provide sufficient differentiation between the economy-class configuration and the business-class configuration.

BRIEF SUMMARY OF THE INVENTION

It is thus an object of the present invention to provide a convertible seating unit, a seating arrangement incorporating such a convertible seating unit, and a transportation vehicle incorporating such a seating arrangement in which the aforesaid shortcomings are mitigated, or at least to provide a useful alternative to the trade and public.

According to a first aspect of the present invention, there is provided a seating unit including a first seat and an adjacent second seat, wherein said seating unit is convertible between a first configuration in which each of said first seat and said second seat is adapted to receive an occupant sitting thereon and a second configuration in which said first seat and said second seat are adapted to collectively support an occupant lying thereon, and wherein access to a space in a back portion of said first seat is denied when said seating unit is in said first configuration and access to said space is allowed when said seating unit is in said second configuration.

According to a second aspect of the present invention, there is provided a seating arrangement including at least a first seating unit and a second seating unit, wherein each of said first seating unit and said second seating unit includes at least two seats, wherein at least said first seating unit includes a first seat and an adjacent second seat, wherein said first seating unit is convertible between a first configuration in which each of said first seat and said second seat is adapted to receive an occupant sitting thereon and a second configuration in which first seat and said second seat are adapted to collectively support an occupant lying thereon, and wherein access to a space in a back portion of said first seat is denied when said first seating unit is in said first configuration and access to said space is allowed when said first seating unit is in said second configuration.

According to a third aspect of the present invention, there is provided a transportation vehicle including a seating arrangement including at least a first seating unit and a second seating unit, wherein each of said first seating unit and second seating unit includes at least two seats, wherein at least said first seating unit includes a first seat and an adjacent second seat, wherein said first seating unit is convertible between a first configuration in which each of said first seat and said second seat is adapted to receive an occupant sitting thereon and a second configuration in which said first seat and said second seat are adapted to collectively support an occupant lying thereon, wherein access to a space in a back portion of said first seat is denied when said first seating unit is in said first configuration and access to said space is allowed when said first seating unit is in said second configuration, and wherein said seats of said at least first and second seating units face a direction which is inclined relative to the direction of travel of said transportation vehicle.

A seating unit according to an embodiment of the present invention, a seating arrangement incorporating such a seating unit and a transportation vehicle incorporating such a seating arrangement will now be described, by way of an example only, with reference to the accompanying drawings, in which:

DETAILED DESCRIPTION OF THE INVENTION

Figure 1:
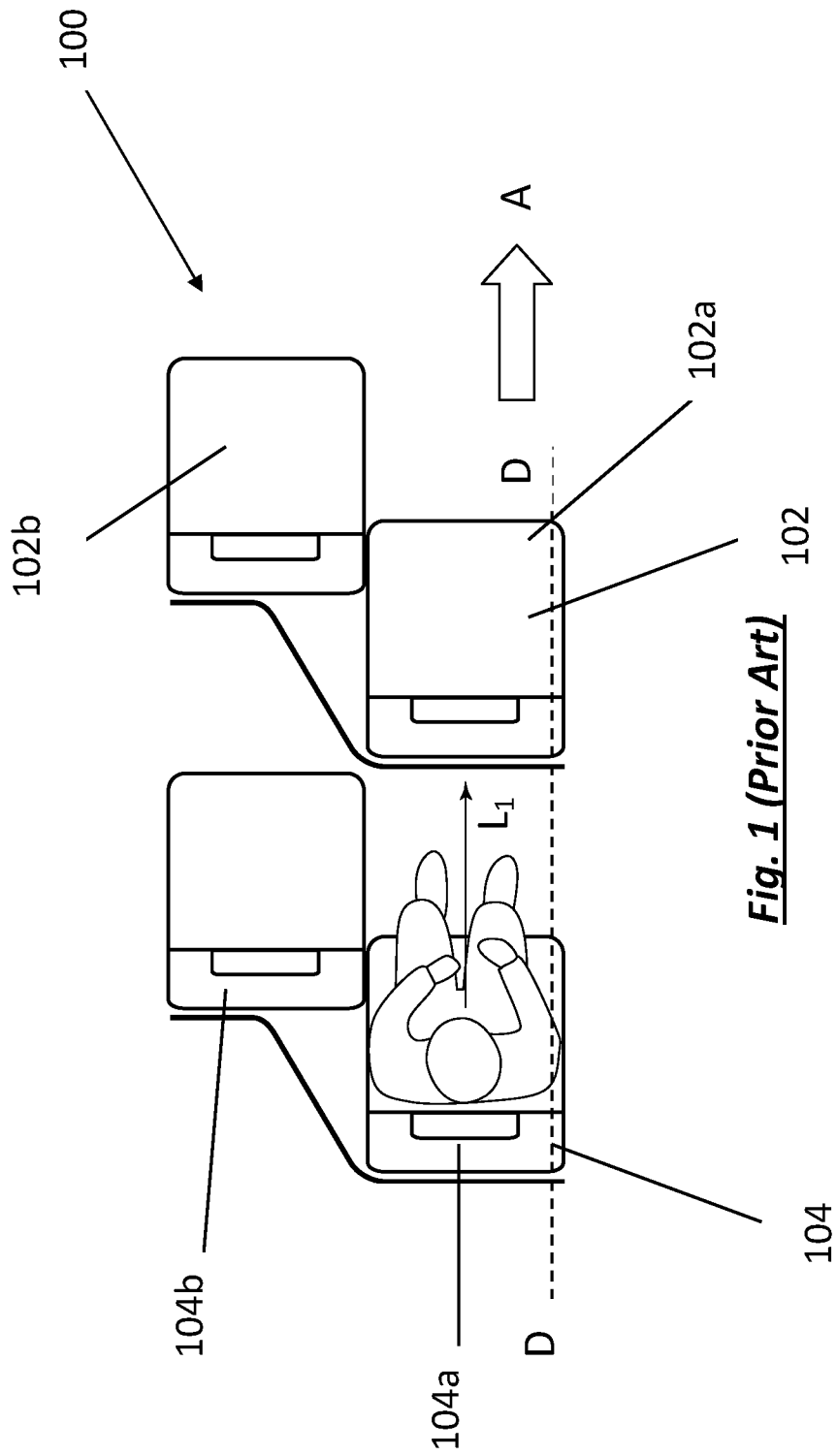
FIG. 1 is a top view of a prior art seating arrangement.

FIG. 1 shows a prior art seating arrangement, generally designated as 100, with two seating units 102, 104, one in front of the other. The seating unit 102 includes two seats 102a, 102b side by side with each other but with the seat 102b slightly forward of the seat 102a; and the seating 104 includes two seats 104a, 104b side by side with each other but with the seat 104b slightly forward relative to the seat 104a. All the seats 102a, 102b, 104a, 104b face a same direction, namely the direction of travel (indicated by the arrow A in FIG. 1) of the transportation vehicle (e.g. aircraft) to which the seating arrangement 100 is installed. In addition, all the seats 102a, 102b, 104a, 104b face a same direction which is parallel to a line D-D which joins a component or part of the seating unit 102 and a corresponding same component or part of the seating unit 104.

Figure 2:
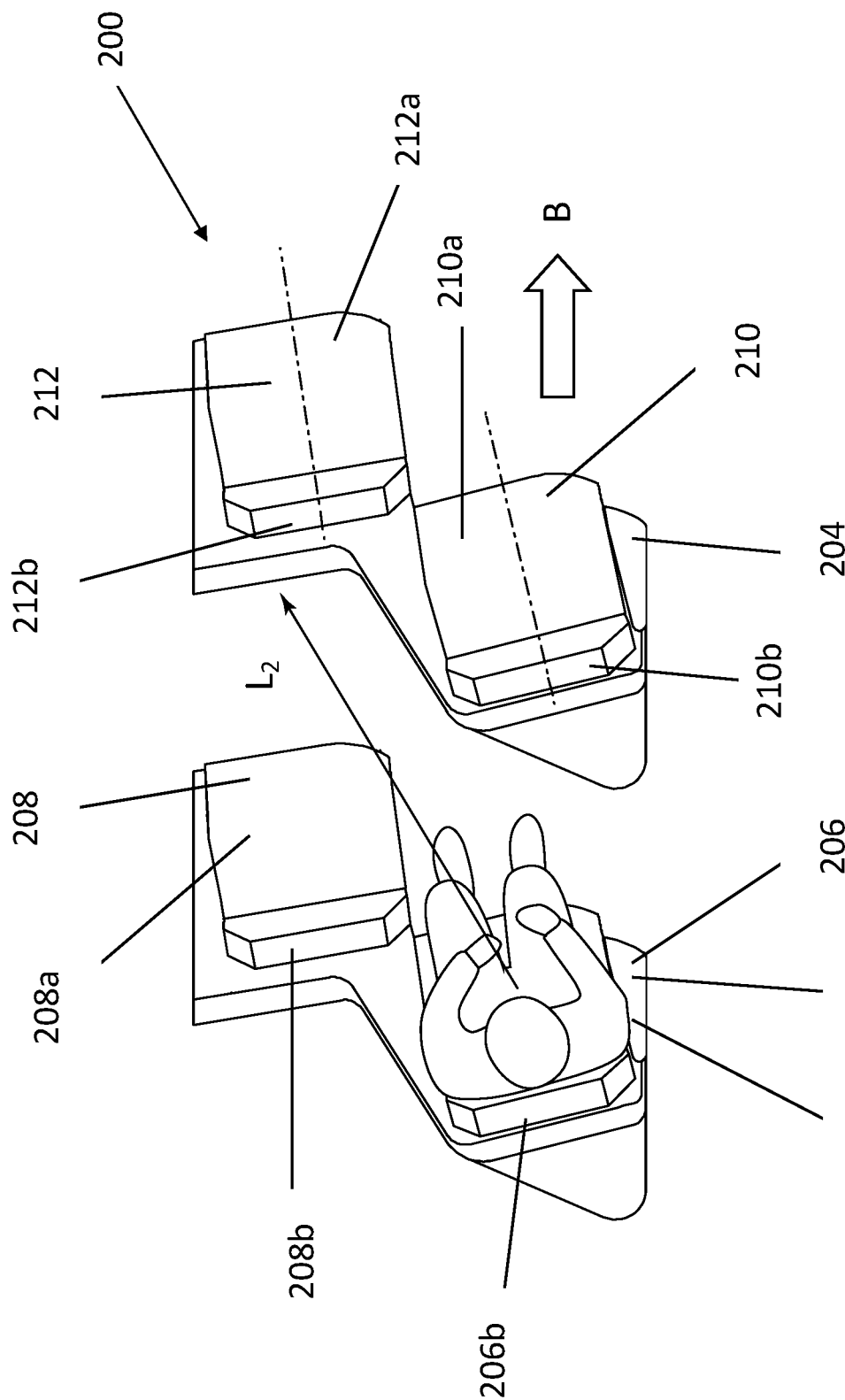
FIG. 2 is a top view of a seating arrangement according to an embodiment of the present invention in a first configuration.
Figure 3:
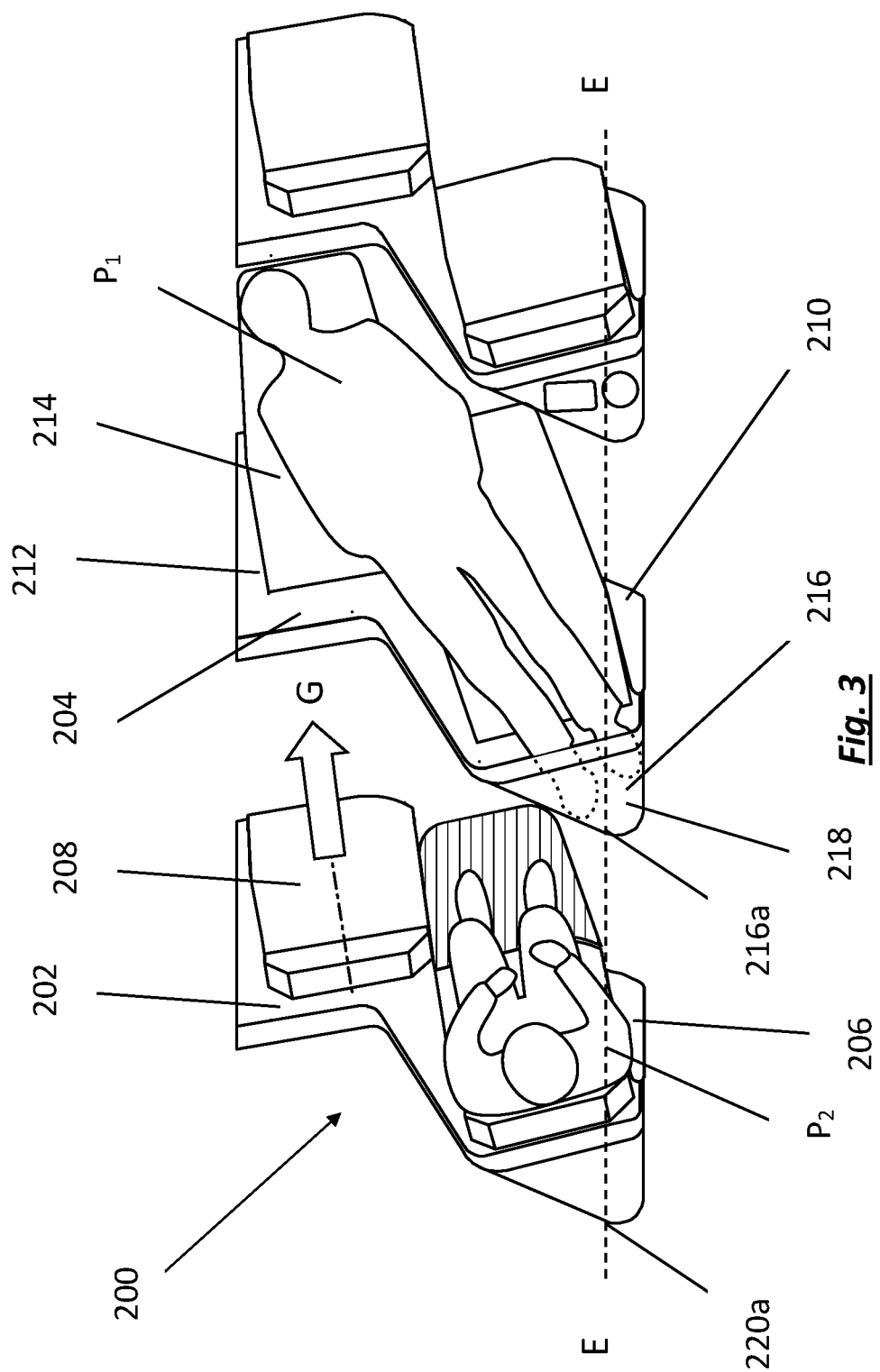
FIG. 3 is a top view of the seating arrangement of FIG. 2 in a second configuration.
Figure 4:
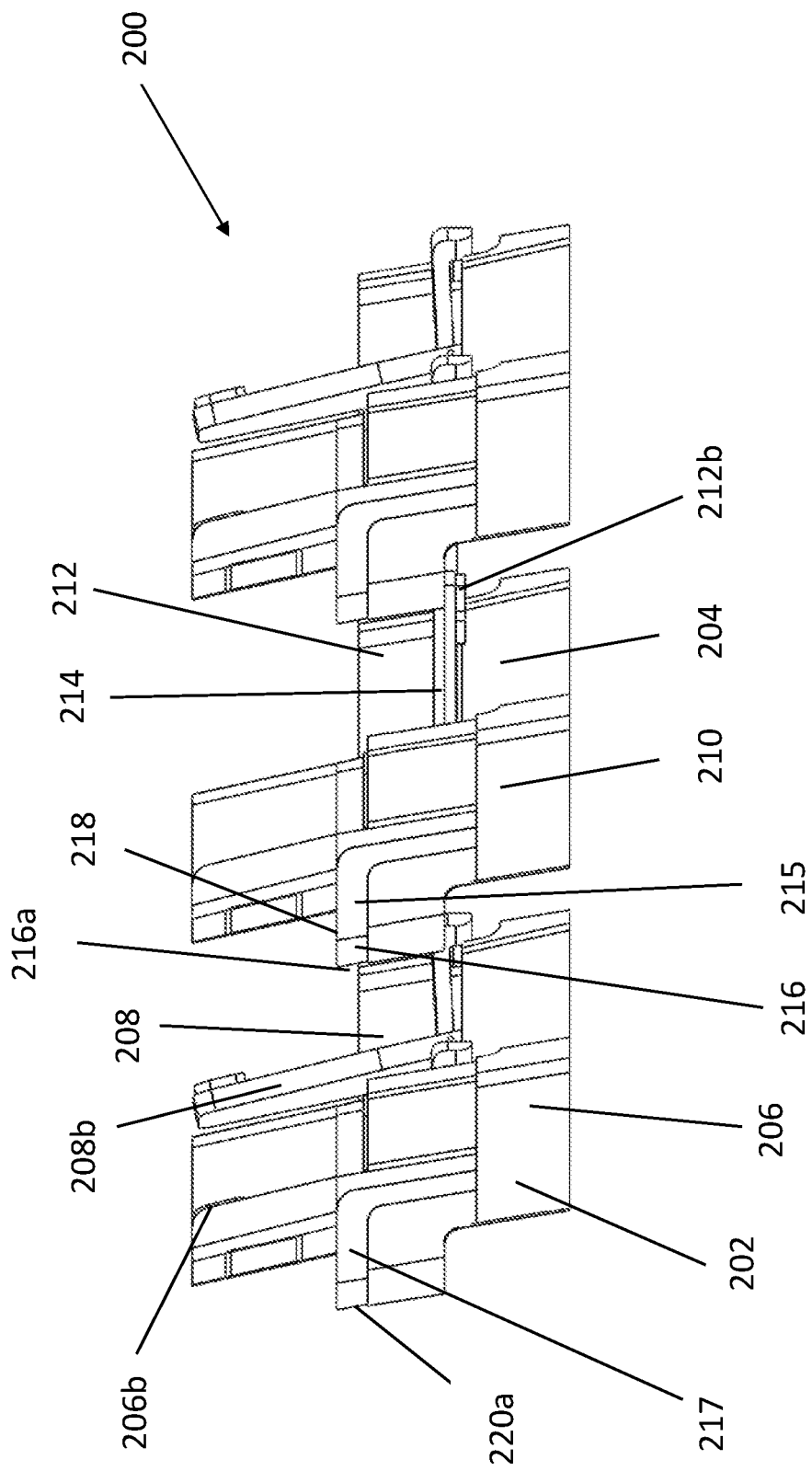
FIG. 4 is a side view of the seating arrangement of FIG. 3, not showing the occupants.

FIGS. 2, 3 and 4 show a seating arrangement according to an embodiment of the present invention, generally designated as 200. The seating arrangement 200 shown in FIG. 2 includes two identically structured seating units 202, 204, with the seating unit 204 positioned in front of and parallel to the seating unit 202. The seating unit 202 includes two seats 206, 208 adjacent to each other, with the seat 208 slightly forward relative to the seat 206. The seat 206 has a seat pan 206a and a seat back 206b pivotally engaged with each other. In the configuration shown in FIG. 2, the seat back 206b is at the back of the seat 206 and extends upwardly from the seat pan 206a. Similarly, the seat 208 has a seat pan 208a and a seat back 208b pivotally engaged with each other. In the configuration shown in FIG. 2, the seat back 208b is at the back of the seat 208 and extends upwardly from the seat pan 208a. The seating unit 204 includes two seats 210, 212 adjacent to each other, with the seat 212 slightly forward relative to the seat 210. The seat 210 has a seat pan 210a and a seat back 210b pivotally engaged with each other. In the configuration shown in FIG. 2, the seat back 210b is at the back of the seat 210 and extends upwardly from the seat pan 210a. Similarly, the seat 212 has a seat pan 212a and a seat back 212b pivotally engaged with each other. In the configuration shown in FIG. 2, the seat back 212b is at the back of the seat 212 and extends upwardly from the seat pan 212a.

When the seating arrangement 200 is installed on a transportation vehicle (e.g. an aircraft), the seats 206, 208 of the seating unit 202 and the seats 210, 212 of the seating unit 204 all face a direction inclined relative to the direction of travel (as indicated by the arrow B) of the transportation vehicle. It can be seen that in the case of a passenger on the seat 104a of the prior art seating unit 104 of the prior art seating arrangement 100, the furthest that he/she can see is the back of the seat 102a of the seating unit 102 immediately in front of him/her. On the other hand, in the case of a passenger on the seat 206 of the seating unit 202 of the seating arrangement 200 according to the present invention, the passenger can easily see the back of the seat 212 of the seating unit 204 immediately in front of him/her (i.e. the seat adjacent the seat immediately in front of the passenger). By comparing FIGS. 1 and 2, it can be easily seen that the line of sight $L_2$ of a passenger in the seat 206 of the seating unit 202 of the seating arrangement 200 according to the present invention is longer than the line of sight $L_1$ of a passenger in the seat 104a of the prior art seating unit 104 of the prior art seating arrangement 100, thus giving the passenger in the seat 206 a perception of increased spaciousness.

The seat backs 206b, 208b, 210b, 212b are pivotally engaged with the respective seat pans 206a, 208a, 210a, 212a of the respective seats 206, 208, 210, 212. As shown more clearly in FIG. 3, and using the seating unit 204 as an example, when the seat back 212b is pivoted relative to the seat pan 212a of the seat 212 away from the upwardly extending position shown in FIG. 2 to the generally horizontally extending position shown in FIGS. 3 and 4, and the seat back 210b is pivoted relative to the seat pan 210a of the seat 210 away from the upwardly extending position shown in FIG. 2 to the generally horizontally extending position shown in FIGS. 3 and 4, back surfaces of the seat backs 206b, 210b are co-planar and conjoined with each other to collectively form a flat horizontal surface to support a passenger to lie thereon. Alternatively, a flat board or mattress 214 may be placed horizontally on and across the back surfaces of the seats 210, 212 to serve as a support on which a passenger may lie.

The seat 210 has a space at a back portion of the seat 210. When the seat back 210b is at the position shown in FIG. 2 in which it is at the back of the seat 210 and extends upward from the seat pan 210a, it covers the space and thus denies access to the space. When the seat back 210b is moved away from the position shown in FIG. 2 (e.g. to the position shown in FIGS. 3 and 4), the space is accessible from the side of the seat 210. The space is defined by a lower support, side walls 215 and an upper cover 216 with a horizontal, flat and upwardly facing outer surface 218. The space is of a generally triangular horizontal cross-section. By way of such an arrangement, when the seating unit 204 is converted from the configuration shown in FIG. 2 to that shown in FIGS. 3 and 4, the space of the seat 210 is accessible to and may be occupied by a part (e.g. feet) of an occupant ($P_1$) of the seating unit 204 lying on the support 214. In the seating arrangement 200, the seats 206, 208 of the seating unit 202 and the seats 210, 212 of the seating unit 204 all face a direction (indicated by the arrow G in FIG. 3) which is inclined by an acute angle relative to a line which joins a component or part of the seating unit 202 and a corresponding same component or part of the seating unit 204, such as a line E-E (as shown in FIG. 3) which joins an edge 216a of the side walls 215 of the space at the back portion of the seating unit 204 and an edge 220a of side walls 217 of a space at a back portion of the seat 206 of the seating unit 202.

By way of such an arrangement, the space at the back portion of the seat 210 effectively increases the length of a flat bed formed by the flat board or mattress 214 on which the occupant $P_1$ of the seating unit 204 may lie, without encroaching into the legroom of a passenger $P_2$ sitting on the seat 206 immediately behind the seat 210. In addition, as shown in FIG. 4, the side walls 215 do not extend to the full height of the cabin of the aircraft, but that the upper cover 216 is at a level at which the outer surface 218 may serve as a small table on which the passenger $P_2$ may put drinks or personal items. Of course, it is also possible to arrange the side walls 215 to extend to full height or close to full height of the cabin of the aircraft so as to create more privacy.

It should be understood that the above only illustrates and describes an example whereby the present invention may be carried out, and that modifications and/or alterations may be made thereto without departing from the spirit of the invention. It should also be understood that various features of the invention which are, for brevity, described here in the context of a single embodiment, may also be provided separately or in any suitable sub-combination.

The invention claimed is:

1. A seating unit for a transportation vehicle, including:
a first seat and a second seat side by side with each other,
wherein said first seat is forward relative to said second seat, and
wherein said first seat and said second seat are inclined to a same side relative to the direction of travel of said transportation vehicle
wherein at least one of said first seat and said second seat includes a first seat pan and a first seat back which are movable relative to each other, wherein said first seat back is movable between a first position in which said first seat back extends upwardly and a second position in which said first seat back extends horizontally, wherein the other of said first seat and said second seat includes a second seat pan and a second seat back which are movable relative to each other, wherein said second seat back is movable between a first position in which said second seat back extends upwardly and a second position in which said second seat back extends horizontally, and wherein, when both said first seat back and said second seat back are in their respective second position, said first seat and said second seat are adapted to collectively support an occupant lying thereon.

* * * * *